United States Patent

[11] 3,551,608

[72] Inventor Andrew Balint
Park Ridge, Ill.
[21] Appl. No. 629,317
[22] Filed Apr. 7, 1967
[45] Patented Dec. 29, 1970
[73] Assignee Bell & Howell Company
Chicago, Ill.
a corporation of Illinois

[54] DISCREPANCY INDICATOR FOR RECORD DUPLICATING APPARATUS

8 Claims, 1 Drawing Fig.

[52] U.S. Cl. 179/100.2
[51] Int. Cl. G11b 5/86
[50] Field of Search 179/100.2B, 100.2E

[56] References Cited

UNITED STATES PATENTS 2,541,037 2/1951 Cole 340/172
2,774,056 12/1956 Stafford et al. 179/100.2

*Primary Examiner*—J. Russell Goudeau
*Attorneys*—Griffin, Branigan and Kindness and William F. Pinsak

ABSTRACT: The disclosed apparatus simultaneously compares a master audio record with a plurality of copies reproduced from the master record. The recording and comparison of the copies takes place at high speed, i.e., the records move at a faster rate than the rate at which the master record was originally recorded. During the comparison operation transducers sense the master record and each copy record. The signal derived from the master record is amplified, rectified and integrated to provide a signal of one polarity while the signals derived from the copy records are amplified, rectified and integrated to provide signals of the opposite polarity. A zero-crossing detector is provided for each copy record. The rectified copy record signal is applied to the corresponding detector while the rectified master record signal is applied to every detector. A detector generates an output signal when the copy record signal drops below a predetermined level and this signal is used to actuate an indicator device.

PATENTED DEC 29 1970
3,551,608
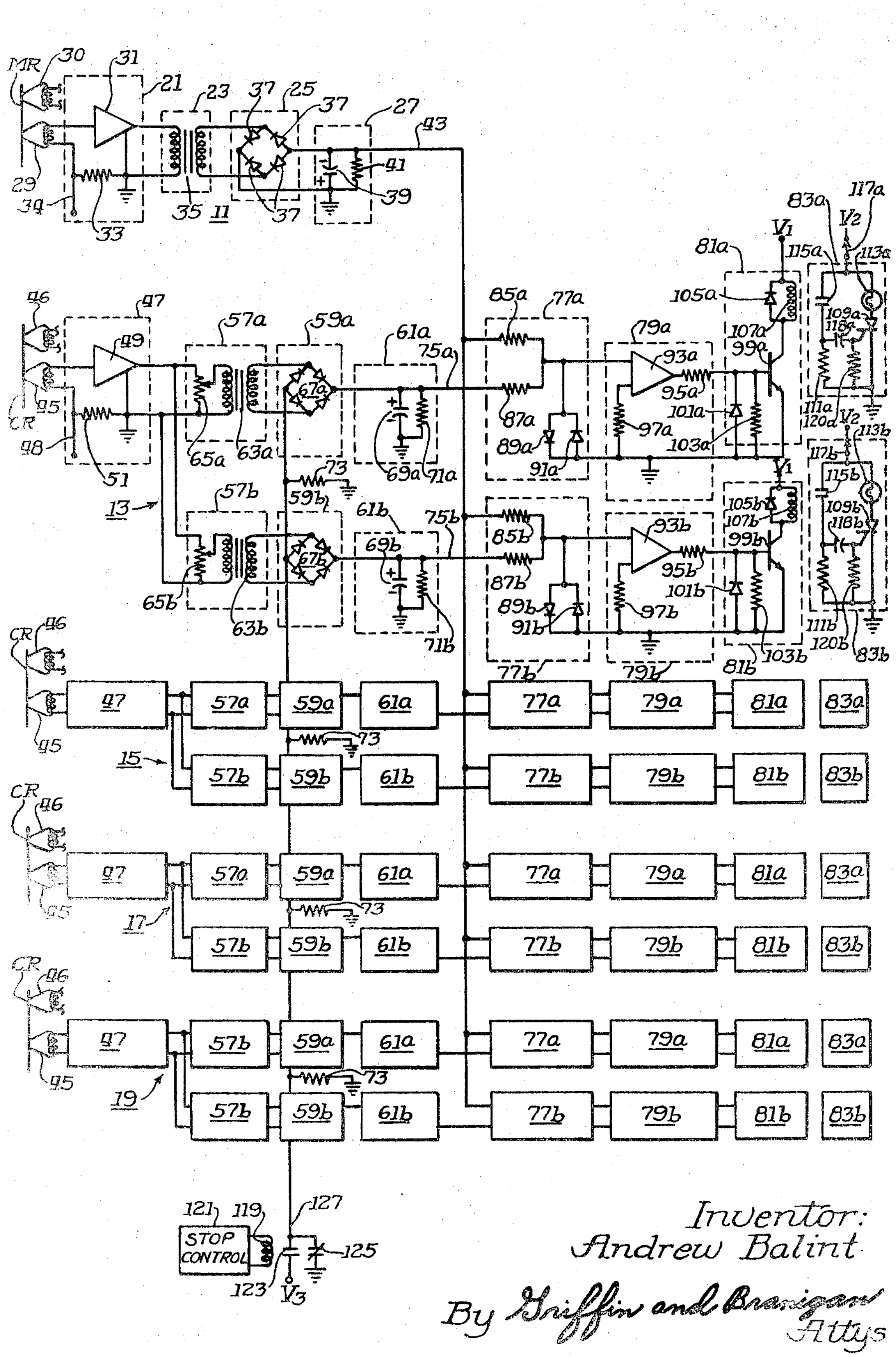
Inventor:
Andrew Balint
By Griffin and Branigan
Attys

DISCREPANCY INDICATOR FOR RECORD DUPLICATING APPARATUS

BACKGROUND OF THE INVENTION

Numerous systems for electronically transferring a signal from a master record to a plurality of copy records are well known. The transferred signal is an audio signal if the master is a voice or music record. However, the signal may be above or below the audio range as well as in the audio range. If the signal is an audio signal, the master and copy records may be phonograph records, tape records, or sound records on motion picture film. Further, the signals may be magnetically, electrostatically, or optically formed on both the master and the copy.

While electronic signal transfer systems have been widely used they are subject to error because of the deterioration of electronic components or because the systems deteriorate by contamination, drift or leakage. As the error increases the signal on the copies may drop below a minimum desired magnitude. Hence, it is desirable to provide a system for comparing the master signals with the copy signals to determine if the copy signals are above a predetermined minimum magnitude.

While audio records could be individually checked by listening to the sound on the copy records, this procedure is highly undesirable because of the time and expense involved in such a quality control method. For example, in the prior art method of preparing sound tracks for motion picture films it has been necessary to make a first run during which the master sound track is sensed and recorded on the copy. The first run was followed by a second run during which each copy was played back and checked by listening to the sound. Thus, each copy was checked by playing it back at regular playback speed and only one copy at a time could be checked.

SUMMARY OF THE INVENTION

It is an object of this invention to provide a new and improved apparatus for quality checking a record copy.

It is also an object of this invention to provide a new and improved apparatus for comparing a master record with a copy record to determine if the signal on the copy record is above or below a predetermined minimum level.

It is a further object of this invention to provide a new and improved system for comparing a master record with a plurality of copy records to determine if the signal on any of the copy records is above or below a predetermined minimum level.

It is a still further object of this invention to provide a system for comparing at high speed, a master record with a plurality of copy records, wherein the master and copy records are audio sound records.

Another object of the invention is to provide a system for sensing a master sound track, recording a plurality of copy sound tracks and comparing said copy sound tracks with said master sound track, all during one pass of the master and copy records through the system.

In accordance with a principle of the invention, a master record signal is rectified into a DC voltage signal of one polarity and a copy record signal is rectified into a DC voltage signal of the opposite polarity. The master DC signal is added to the copy DC signal and the summation is applied to a zero-crossing detector. When the level of the copy signal drops below a predetermined value the summed input to the zero-crossing detector passes through zero and the zero-crossing detector generates an output signal. This output signal is applied to an indicating device to indicate that the copy signal has dropped below the predetermined value.

A plurality of copy signals may be compared with a master signal by providing a rectification circuit, a summation circuit, and a zero-crossing detector for each copy signal. In this case the rectified master signal is applied in parallel to each of the summation circuits.

In order to transfer a master record signal to a copy record and compare the two records on the same pass of the records through the system, two reproduce transducers are provided for the master record and one recording and one reproduce transducer is provided for the copy record. The first master reproduce transducer feeds a conventional recording amplifier which has its output connected to the recording transducer associated with the copy record. The second master reproduce transducer is spaced from the first in the direction of record medium movement and the copy reproduce transducer is spaced from the copy recording transducer by a like distance. The second master reproduce transducer and the copy reproduce transducer feed the comparison circuits as indicated above.

BRIEF DESCRIPTION OF THE DRAWING

The foregoing objects and many of the attendant advantages of this invention will become more readily appreciated as the same becomes better understood by reference to the following detailed description, when taken in conjunction with the accompanying drawing, wherein the FIG. is a partial block and partial schematic diagram illustrating a preferred embodiment of the invention.

DESCRIPTION OF THE PREFERRED EMBODIMENT

For purposes of illustration only, the invention is hereinafter described as it might be embodied in a system for preparing and checking the sound tracks recorded on copies of a motion picture film. However, it will be obvious from the following description that the invention may be used for comparing other types of records.

The preferred embodiment of the invention illustrated in the FIG. comprises a master channel 11, and four copy channels 13, 15, 17 and 19. However, any number of copy channels may be provided as desired. Since the copy channels are identical, only the first copy channel 13 and the master channel 11 are schematically illustrated.

The master channel generally comprises a master-complifying circuit 21, a master-coupling circuit 23, a master-rectifying circuit 25, and a master-integrating circuit 27. The input to the master amplifier 21 is illustrated as connected to a master magnetic read head 29 for reading a master record MR. However, the master magnetic read head is merely by way of example since any record-sensing transducer such as an optical read head or an electrostatic read head may be used.

The master-amplifying circuit 21 comprises a master amplifier 31 and a resistor 33. One side of the output from the master magnetic read head is connected to the input of the amplifier 31 and the other side of the output of the master magnetic read head is connected through the resistor 33 to ground. A line 34 is connected to a separate input terminal so that a signal can be conveniently applied to resistor 33 to calibrate the system.

The master-coupling circuit 23 comprises a master transformer 35. The output of the master-amplifying circuit 21 is connected to the primary winding of the master transformer 35 and the secondary winding of the master transformer 35 is connected to the input of the master-rectifying circuit 25. The master-rectifying circuit comprises four diodes 37 connected in a bridge configuration. The output from the bridge network is connected to the input of the master integrator 27. The master integrator 27 comprises a capacitor 39 connected in parallel with a resistor 41.

The diodes 37 of the master-rectifying circuit 25 are poled such that the capacitor 39 has its positive side grounded and its negative side above ground. Hence, the output signal on the output line 43 of the master channel is negative. However, this negative signal is merely by way of illustration. If it is desired to have a positive signal from the master channel the diodes would only have to be poled in the opposite direction. The master-integrating circuit integrates the output from the diode rectifiers to eliminate pulse or spike signals caused by dirt or other matter adhering to the master record MR. Hence, the DC signal on the master output line 34 is a relatively slowly varying negative signal.

Each copy channel comprises a copy-amplifying circuit 47 and first and second subchannels. The first subchannel comprises a first copy-coupling circuit 57*a*, a first copy-rectifying circuit 59*a*, and a first copy-integrating circuit 61*a*. Similarly, the second subchannel comprises a second copy-coupling circuit 57*b*, a second copy-rectifying circuit 59*b*, and a second copy-integrating circuit 61*b*.

Each copy-amplifying circuit comprises a copy amplifier 49 and a resistor 51. In a manner similar to the connection to the amplifier of the master channel, a copy magnetic read head 45 is adapted to read a copy record CR and has one end connected to the copy amplifier 49 and the other end connected through the resistor 51 to ground. And, a line 48 is connected to a separate input terminal so a calibration signal can be conveniently applied to the resistor 51.

Each copy subchannel is identical hence only the first subchannel of channel 13 will be described in detail. The copy subchannel-coupling circuit comprises a potentiometer 65*a* and a transformer 63*a*. The copy subchannel-rectifying circuit comprises a four diode bridge 67*a* and the copy subchannel-integrating -integrating circuit comprises a copy capacitor 69*a* connected in parallel with a resistor 71*a*.

The output from the copy amplifier is connected to one end of potentiometer 65*a* with the other end of the potentiometer being connected to ground. The tap of the potentiometer is connected to one end of the primary winding of the transformer 63*a* of the copy-coupling circuit. The other end of the primary winding is connected to ground. The secondary winding of the copy transformer 63*a* is connected to the input of the copy diode bridge 67*a*. One output of the diode bridge is connected through the parallel capacitor and resistor combination to ground and the other output is connected through a resistor 73 to ground. The junction between the parallel combination and the bridge is connected to a copy output line 75*a*.

The bridge diodes of the copy subchannels are poled in the opposite direction to the bridge diodes of the master channel. Hence, while the output from the master channel is a negative signal on the line 43, the outputs from the copy subchannels are positive signals on the lines 75*a* and 75*b*. However, if the diodes in the master channel were poled such that line 43 carried a positive signal then the diodes in the subchannels would be reversed so that the copy output signals would be negative. As with the master channel-integrating circuit the copy channel-integrating circuit integrates the copy signal to provide a relatively slowly varying positive DC signal. The copy and master signals are compared as subsequently described.

Each subchannel also includes a comparison and detection means. Since the comparison and detection means for each of the subchannels is identical, only the comparison and detection means for the first subchannel of channel 13 will be described. Generally speaking, it comprises a summation network 77*a*, a zero-crossing detector 79*a*, a trigger circuit 81*a*, and an indication circuit 83*a*.

The summation network comprises a pair of resistors 85*a* and 87*a* and a pair of oppositely poled diodes 89*a* and 91*a* connected in parallel. One end of resistor 85*a* is connected to the master channel signal line 43 and one end of the resistor 87*a* is connected to the subchannel output line 75*a*. The other ends of the resistors are connected together and to one end of the pair of diodes 89*a* and 91*a*. The other end of the parallel diodes is connected to ground.

The zero-crossing detector 79*a* comprises an operational amplifier 93*a*, a resistor 95*a*, and a resistor 97*a*. Preferably, the operational amplifier only generates an output signal when its input signal is negative. The first input to the operational amplifier 93*a* is connected to the junction between the resistors and the diodes of the summation network 77*a*. The second input of the operational amplifier 93*a* is connected through the resistor 97*a* to ground and the output of the operational amplifier is connected to one end of the resistor 95*a*.

The trigger circuit 81*a* comprises an NPN transistor 99*a*, a first diode 101*a*, a resistor 103*a*, a second diode 105*a*, and the coil 107*a* of a relay. The output end of resistor 95*a* is connected to the base of the NPN transistor 99*a*, and the emitter of the transistor is connected to ground. The base of the transistor is connected through the resistor 103*a* in parallel with the first diode 101*a* to ground. The collector of the transistor 99*a* is connected through the parallel combination of coil 107*a* and diode 105*a* to a voltage source V1. The diode 105*a* is poled to prevent oscillatory voltage fluctuations from energizing the coil 107*a*.

The indicating circuit comprises a silicon-controlled rectifier (SCR) 109*a*, a first resistor 111*a*, an indicator lamp 113*a*, a pair of relay contacts 115*a*, a switch 117*a*, a coupling capacitor 118*a*, and a second resistor 120*a*. The contracts 115*a* are operated by the energization of the relay coil 107*a* of the trigger circuit 81*a*. The anode-cathode terminals of the SCR 109*a* are connected in series with the lamp 113*a* and the switch 117*a* between a voltage source V2 and ground. Contacts 115 *a* and the first resistor 111*a* are connected in series between ground and the switch 117. Connected in parallel with the first resistor 111*a* is the series connected second resistor 120*a* and coupling capacitor 118*a*. The junction between the coupling capacitor 118*a* and the second resistor 120*a* is connected to the gate of the SCR.

The operation and advantages of the invention may be best appreciated by considering a specific application. Assume that the master record MR is a magnetic sound recording film having recorded thereon the sound track for a motion picture. Assume further that each copy record CR is a printed photographic copy made from a master film print. Each copy record carries a magnetic strip upon which an accompanying sound track is to be recorded. A read head 30 senses the sound track on master record MR and, after suitable amplification and equalization by conventional circuit means (not shown), this sound track is magnetically reproduced on each of the copy records by a recording head 46.

The present invention may be used to check the sound tracks recorded on each of the copy records to insure that it is above a desired level. Furthermore, this check may be performed while subsequent portions of the copy records are still being recorded. To accomplish this, the master record reproduce head 29 is spaced from reproduce head 30 in the direction of movement of the record medium and each of the copy playback heads 45 is spaced from the copy recording heads 46 by a like distance. The master record and the copy record mediums are driven in synchronism by conventional means not shown.

A signal on the master record is sensed by reproduce head 30 and recorded on each of the copy records by the recording heads 46. Immediately thereafter, the same master signal is sensed by reproduce head 29 at the same time each of the reproduce heads 45 senses the signal that was recorded on each of the copy records. The present invention individually compares the signal from head 29 with the signals from each of the heads 45 to determine if each of the copy record signals was recorded at an acceptable signal level.

The master record signal is amplified by amplifying circuit 21, rectified by the circuit 25 and integrated by integrator circuit 27 to provide a varying DC signal on lead 43. This signal is a negative signal and is applied to one input of each of the summing circuits 77*a* and 77*b*.

At the same time, each copy record signal is amplified by the associated amplifying circuit 47. Considering now only channel 13 (the other channels operate in similar manner) the output of amplifying circuit 47 is attenuated by potentiometer 65*a*, rectified by the circuit 59*a*, and integrated by circuit 61*a* to provide a varying DC signal on lead 75*a*. This signal is a positive signal and is applied to the second input of the summing circuit 77*a* associated with the first subchannel of channel 13. In like manner, the output of amplifying circuit 47 is attenuated by potentiometer 65*b*, rectified by the circuit 59*b*, and integrated by circuit 61*b* to provide a varying DC signal on lead **75*b*. This signal is a positive signal and is applied to the second input of the summing circuit 77*b* associated with the second subchannel of channel 13**.

To degress for a moment, assume that any copy record is perfectly satisfactory as long as the level of the signal recorded thereon never falls below a predetermined level. For example, assume that a copy record is satisfactory if the signal recorded thereon does not fall more than 6*db* below the level of the master record signal. Assume further that it is desirable that the recording circuits (not shown) be adjusted if the level of a copy signal falls more than 3*db* but less than 6*db* below the level of the master record signal. Under these assumptions, and again using channel 13 as an example, the circuit of the invention is adjusted as follows.

The tap on potentiometer **65*a* of the first subchannel is adjusted so that a "normal" level signal on the copy record results in a positive signal on lead 75*a*** which is 3*db* above the negative signal on lead 43. The tap on potentiometer **65*b* of the second subchannel is adjusted so that a normal level signal on the copy record results in a positive signal on lead 75*b*** which is 6*db* above the negative signal on lead 43. Thus, as long as the copy record signal does not fall more than 3*db* below the level of the master record signal, the summing network **71*a*** associated with the first subchannel produces a positive output signal. However, if the copy record signal falls more than 3*db* below the level of the master record signal, the output of the summation circuit changes from positive to negative thus activating the zero-crossing detector connected to its output.

In like manner, the summing network **77*b*** associated with the second subchannel normally produces a positive output signal which becomes negative to activate the associated zero-crossing detector only when the level of the signal on the copy record falls more than 6*db* below the level of the master record signal.

If the recording circuits (not shown) between master head 30 and any of the copy-recording heads 46 begin to deteriorate, the level of the signal recorded on the copy record will drop. This will be manifested during the comparison operation by a drop in the level of the signals on leads **75*a* and 75*b*** of the channel which is associated with the affected copy record. Nothing happens until the level of the recorded copy signal drops more than 3*db* below the level of the signal on the master record. At this time the output of the subchannel summing circuit **77*a* goes negative thus activating the zero-crossing detector 93*a*. The detector produces an output signal to turn on the transistor 99*a*. Current flows through the collector-emitter circuit to energize relay 107*a*. When relay 107*a* is energized it closes its contacts 115*a* thus applying the voltage V2 to the gate of SCR 109*a* through the coupling capacitor 118*a*. This triggers the SCR and a circuit is established from V2 through switch 117*a*, indicator 113*a***, and the cathode-anode of the SCR, to ground.

Once the SCR is turned on it remains on until switch **117*a* is opened. Thus, the indicator 113*a* will remain energized even though the transistor 99*a* cuts off and relay 107*a* is deenergized. The indicator 113*a* remains energized to indicate to the operator that at the first convenient opportunity he should adjust the recording circuits which record the signals on this channel. After the adjustment has been made, the operator momentarily opens switch 117*a* to deenergize SCR 109*a* and the indicator 113*a***.

If the operator should ignore the indicator **113*a***, or if something catastrophic should happen in the recording circuits which record the signal on the copy record, the recording level may drop more than 6*db* below the level of the master record signal. At this point the output of summing circuit **77*b* would go from positive to negative thus activating zero-crossing detector 93*b*. The detector produces an output signal to turn on transistor 99*b* and this in turn energizes relay 107*b*. The relay contacts 115*b* close thus activating SCR 109*b* and indicator 113*b***.

Preferably, the relay **107*b*** carries a set of contacts (not shown) which are located in the stop controls for the record driving mechanism. Thus, the recording process may be immediately terminated since the resulting sound track on the copy record would be unsatisfactory for commercial use.

Also illustrated in the FIG. is a pseudovoltage circuit arranged to apply a voltage to the copy channels to prevent an error indication during a warmup period or when comparison is not being performed. Specifically, the pseudocircuit comprises a relay coil 119 connected to the stop control 121. The relay has two sets of contacts 123 and 125. The first set of contacts are normally open and connected between a voltage source V3 and a line 127. The line 127 is connected at its other end to the junctions where the diode bridges **59*a* and 59*b* connect with the resistor 73. The second set of contacts 125 are connected between ground and the junction of the first set of contacts 123 and line 127**. The second set of contacts are normally closed.

By this manner of connection, a positive signal V3 is applied to the copy channel bridges when the relay coil 119 is energized by the stop control 121. This signal passes through the bridges to compensate for a no signal condition from the copy channels. If the pseudocircuit was not included in the system the indicators would indicate an error condition any time a master signal occurred and no copy signal occurred. This condition is likely to happen during warmup or during synchronization between the master and copy channels.

While the foregoing has described a simple device for providing an indication when the magnitude of a copy signal drops below a predetermined level, it will be appreciated that other systems can be used to carry out the general concept of the invention. That is, the preferred embodiment illustrated in the FIG. illustrates one-type of zero-crossing detector suitable for use with the invention and illustrates one means for obtaining the opposite polarity master and copy signals. However, it will be apparent to those skilled in the art and others that other types of systems to provide these functions can be used. In general, the invention contemplates a system for obtaining positive and negative signals from copy and master channels and comparing these signals in a zero-crossing detector. The zero-crossing detector is adapted to generate an output signal when the copy signal falls below a predetermined level. While the specification has specified 3*db* and 6*db* signal levels, these are merely by way of example and any desired amount of copy signal deviation can be provided for by adjusting the potentiometers in the copy subchannels.

Moreover, the system may be used for quality control of copies other than motion picture sound tracks and in this case a different significance might be attached to the indicators. For example, in recording high quality sound tapes or discs for commercial sale, a copy would be classified as "best grade" if neither indicator **113*a* or 113*b* was turned on during the recording process, but might be classified as a "second" if only indicator 113*a*** was turned on, and as a "reject" if both indicators were turned on.

In addition, the copy records have been illustrated as magnetic records, however, they could be optical or electrostatic records. Hence, the invention may be practiced otherwise than as specifically described herein.

I claim:

1. A discrepancy indicator for comparing master and copy signals and for generating error signals when said master and copy signals are not within predetermined ranges comprising:

a master channel for detecting a recorded master signal, including small changes in said recorded master signal, and for generating a DC output voltage of one polarity;

a copy channel including two subchannels for detecting a recorded copy signal, including small changes in said recorded copy signal, and for generating two DC output voltages, said two DC output voltages being at different levels, both of said levels being greater by a predetermined amount than the level of said DC output voltage generated by said master signal channel and opposite in polarity thereto;

a comparison and indicator channel including two subchannels, one of said two subchannels being connected to the output of said master channel and to the output of one of said subchannels of said copy channel for comparing said two outputs and for generating an indication when the level of the output of said one of said subchannels of said copy channel drops below the level of the output of said master channel, and the other of said two subchannels being connected to the output of said master channel and to the output of the other of said subchannels of said copy channel for comparing said two outputs and for generating an indication when the level of the output of said other of said subchannels of said copy channel drops below the level of the output of said master channel; and a pseudocircuit connected to the subchannels of the copy channel so as to apply a substitute signal, above the level of the output of said master channel, to said subchannels during predetermined periods of the operation of said discrepancy indicator so as to prevent said subchannels of said comparison and indicator channel from generating an indication during said predetermined periods.

2. A discrepancy indicator as claimed in claim 1 wherein each of said two subchannels of said comparison and indicator channel includes an indicator light and a triggerable switch connected to said indicator light, said triggerable switch being connected so as to be triggered when the output voltage level of the associated subchannel of the copy channel drops below the output voltage level of the master channel and to remain triggered after having been triggered even though the output voltage level of the associated subchannel of the copy channel rises above the output voltage level of the master channel.

3. A discrepancy indicator for comparing master and copy signals and for generating error signals when said master and copy signals are not within predetermined ranges comprising:

a. a master channel for detecting a recorded master signal, including small changes in said recorded master signal, and for generating a DC output voltage of one polarity, said master channel comprising:
   1. a master read head for sensing recorded signals generated by a master record;
   2. a master amplifier connected to said master read head;
   3. a master transformer having its primary winding connected to the output of said master amplifier;
   4. a master diode bridge having one pair of opposing terminals connected across the secondary winding of said master transformer; and,
   5. a master integrating circuit connected across the other pair of opposing terminals of said master diode bridge;

b. a copy channel for detecting a recorded copy signal, including small changes in said recorded copy signal, and for generating two DC output voltages, said two DC output voltages being at different levels, both of said levels being greater by a predetermined amount than the level of said DC output voltage generated by said master signal channel and opposite in polarity thereto, said copy channel comprising:
   1. a copy read head for reading signals generated by a copy record;
   2. a copy amplifier connected to said copy read head;
   3. a first potentiometer having its input connected across the output of said copy amplifier and a first transformer having its primary winding connected across the output of said first potentiometer;
   4. a second potentiometer having its input connected across the output of said copy amplifier and a second transformer having its primary winding connected across the output of said second potentiometer;
   5. a first copy diode bridge having one pair of opposing terminals connected across the secondary winding of said first transformer;
   6. a second copy diode bridge having one pair of opposing terminals connected across the secondary winding of said second transformer;
   7. a first copy integrating circuit connected across the other pair of opposing terminals of said first copy diode bridge; and,
   8. a second copy integrating circuit connected across the other pair of opposing terminals of said second copy diode bridge; and, c. a comparison and indicator channel including two subchannels, one of said two subchannels being connected to the output of said master channel and to the output of said first copy-integrating circuit of said copy channel for comparing said two outputs and for generating an indication when the level of the output of said first copy-integrating circuit of said copy channel drops below the level of the output of said master channel, and the other of said two subchannels being connected to the output of said master channel and to the output of said second copy-integrating circuit of said copy channel for comparing said two outputs and for generating and indication when the level of the output of said second copy-integrating circuit of said copy channel drops below the level of the output of said master channel.

4. A discrepancy indicator as claimed in claim 3 wherein said comparison and indicator subchannels each comprise:

a zero-crossing detector having one input connected to said master-integrating circuit and a second input connected to one of said copy-integrating circuits;

an amplifier adapted to sense signals of one polarity connected to the output of said zero-crossing detector;

a trigger circuit having its input connected to the output of said amplifier; and, an indicator circuit connected to the output of said trigger circuit.

5. A discrepancy indicator as claimed in claim 4 wherein said trigger circuit comprises relay coil and a transistor trigger connected in series with said relay coil.

6. A discrepancy indicator as claimed in claim 5 wherein said indicator circuit comprises: an indicator lamp; a silicon controlled rectifier having its cathode-anode terminals connected in series with said indicator lamp; and, a pair of contacts operated by said relay coil, said pair of contacts connected to the gate of said silicon controlled rectifier so that said silicon controlled rectifier is triggered when said contacts are closed.

7. A discrepancy indicator as claimed in claim 6 including a pseudocircuit connected to the first and second copy diode bridges of the copy channel so as to apply a substitute signal, above the level of the output of said master channel, to said first and second copy diode bridges during predetermined periods of operation of said discrepancy indicator so as to prevent said indicator lamps of said indicator circuit from igniting during said predetermined periods.

8. A discrepancy indicator as claimed in claim 7 wherein said pseudocircuit comprises a stop control circuit and a relay having a first set of normally closed contacts and a second set of normally open contacts, said relay being operated by said stop control circuit which circuit is energized when records are not being read by said copy read head, said first pair of contacts being connected to ground at one side and said second pair of contacts being connected to a source of DC voltage at one side, the other sides of said first and second pairs of contacts being connected together and to one terminal of the first and second diode bridges of said copy subchannels.